United States Patent
Lochocki, Jr. et al.

(10) Patent No.: US 7,228,783 B2
(45) Date of Patent: Jun. 12, 2007

(54) PRESSURE CONTROL SYSTEM FOR A TORQUE-TRANSMITTING MECHANISM

(75) Inventors: Ronald F. Lochocki, Jr., Ypsilanti, MI (US); Robert L. Moses, Ann Arbor, MI (US); Shushan Bai, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/198,251

(22) Filed: Aug. 5, 2005

(65) Prior Publication Data

US 2007/0028760 A1 Feb. 8, 2007

(51) Int. Cl.
*F15B 13/044* (2006.01)

(52) U.S. Cl. .............................. 91/459; 91/461; 91/361

(58) Field of Classification Search .................. 91/361, 91/433, 459, 461; 251/129.1
See application file for complete search history.

(56) References Cited

U.S. PATENT DOCUMENTS

| | | | | |
|---|---|---|---|---|
| 5,899,436 A | * | 5/1999 | Holmes et al. | 251/129.1 |
| 5,908,098 A | * | 6/1999 | Gorman et al. | 137/625.64 |
| 6,669,598 B2 | * | 12/2003 | Berger et al. | 477/45 |

* cited by examiner

*Primary Examiner*—Michael Leslie
(74) *Attorney, Agent, or Firm*—Dan L. Thompson

(57) ABSTRACT

The present invention provides a pressure control system having a control solenoid with plurality of coils disposed therein, and operable to provide a plurality of pressure gain characteristics to a torque-transmitting mechanism. By selectively energizing the individual coils or a combination thereof, multiple pressure gains may be achieved with a minimum of additional system hardware.

11 Claims, 4 Drawing Sheets

PRESSURE CONTROL SYSTEM FOR A TORQUE-TRANSMITTING MECHANISM

TECHNICAL FIELD

This invention relates to a pressure control system for a torque-transmitting mechanism having a control solenoid with a plurality of selectively energizable coils disposed therein, and operable to provide pressurized fluid with a plurality of pressure gain characteristics to the torque-transmitting mechanism.

BACKGROUND OF THE INVENTION

Automatic shifting power transmissions include a plurality of torque-transmitting mechanisms such as friction clutches and brakes. These clutches and brakes are generally fluid-operated mechanisms, which require a fluid pressure control to complete engagement and disengagement of the torque-transmitting mechanism. These mechanisms and their structure are well known in the art, as are many pressure controls for establishing the engagement and disengagement of the torque-transmitting mechanism.

In many automatic shifting transmissions, it is desirable to control the engagement pressure of a torque-transmitting mechanism at an increasing rate or a ramp rate during engagement of the torque-transmitting mechanism and to increase the pressure to a maximum value when the torque transmitting mechanism has been fully engaged. The ramp control of the apply pressure is important in that it controls the frictional engagement at low levels during ratio interchanges when the on-coming torque-transmitting mechanism is being engaged and the off-going torque-transmitting mechanism is being disengaged.

Many of the prior art controls for torque-transmitting mechanisms incorporate variable gain valves wherein a first control rate is used during a portion of the engagement and a second control rate is used during the remainder of the control pressure engagement. Many of these valves incorporate differential areas formed on a valve spool to provide the different gain rates that are required for control of the torque-transmitting mechanism.

Additionally, many of the prior art control mechanisms employ a solenoid signal, which is controlled at pressure levels to provide the required gain at the torque-transmitting mechanism. These solenoids might be a variable bleed pulse-width modulated solenoid (PWM), or a two-stage solenoid, all of which are well known to those skilled in the art. These solenoid pressure controls are generally established by a programmable electronic control module, which contains the necessary information for controlling the torque-transmitting mechanism pressure throughout a shift interchange, or a ratio interchange as well as controlling the pressure after the interchange is completed. Often, the control pressure of the solenoid valve is utilized to provide the full range of torque-transmitting mechanism pressure required for both regulation during ratio interchanges and full engagement.

In many instances, additional pressure gain characteristics are desired to provide differing torque-transmitting mechanism engagement pressures. This is especially true when one torque-transmitting mechanism is employed to effect shifting of more than one gear. In this case, the torque-transmitting mechanism may have multiple pressure requirements for holding full torque in each of the gears. Historically, for each of the pressure gain characteristics, additional system hardware was required. This hardware may include boost valves, regulators, and/or a multiplexed system of solenoids and regulators capable of providing a control pressure to the trim pressure regulator valve.

SUMMARY OF THE INVENTION

The present invention provides a pressure control system for a torque-transmitting mechanism having a control solenoid with plurality of coils disposed t and operable to provide a plurality of pressure gain characteristics to a torque-transmitting mechanism. By selectively energizing the individual coils or a thereof, multiple pressure gains may be achieved with a minimum of additional system hardware.

Accordingly, the present invention provides a pressure control system for a torque-transmitting mechanism having a control passage operable to provide a control pressure signal and a line pressure passage operable to provide a line pressure signal. A trim pressure regulator valve body is provided in fluid communication with the control passage and the line pressure passage. The trim pressure regulator valve body has a torque-transmitting mechanism feed port in fluid communication with a torque-transmitting mechanism feed passage and operable to direct a torque-transmitting mechanism apply pressure signal to the torque-transmitting mechanism. Also provided is a valve spool slidably disposed within the trim pressure regulator valve body and operative in response to pressure from the control passage to control fluid pressure communicated between the line pressure passage and the torque-transmitting mechanism. Additionally, a control solenoid having a plurality of selectively energizable coils disposed therein and operable to selectively provide the control passage with pressurized fluid at varying rates of pressure gain depending upon which of the plurality of selectively energizable coils are energized.

The control solenoid of the present invention may be a variable bleed, pulse width modulated, or two-stage solenoid. The plurality of selectively energizable coils of the control solenoid may number two, and may be selectively energized by an electronic control module.

The pressure control system for a torque-transmitting mechanism of the present invention may also include a pressure switch in fluid communication with the trim pressure regulator valve body and operable to selectively receive the line pressure signal from the line pressure passage for diagnostic purposes.

An alternate embodiment of the present invention provides a pressure control system for a selectively engageable torque-transmitting mechanism having a line pressure passage operable to provide a line pressure signal and a torque-transmitting mechanism feed passage. A control solenoid is provided in fluid communication with the line pressure passage and the torque-transmitting mechanism feed passage. The control solenoid has a plurality of selectively energizable coils disposed therein, and is operable to selectively provide the torque-transmitting mechanism feed passage with pressurized fluid at varying rates of pressure gain depending upon which of the plurality of selectively energizable coils are energized. Additionally, a torque-transmitting mechanism is provided in fluid communication with the torque-transmitting mechanism feed passage and selectively engageable by the pressurized fluid within the torque-transmitting mechanism feed passage.

The control solenoid of the alternate embodiment of the present invention may be a variable bleed, pulse width modulated, or two-stage solenoid. The plurality of selectively energizable coils of the control solenoid may number two, and may be selectively energized by an electronic control module.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
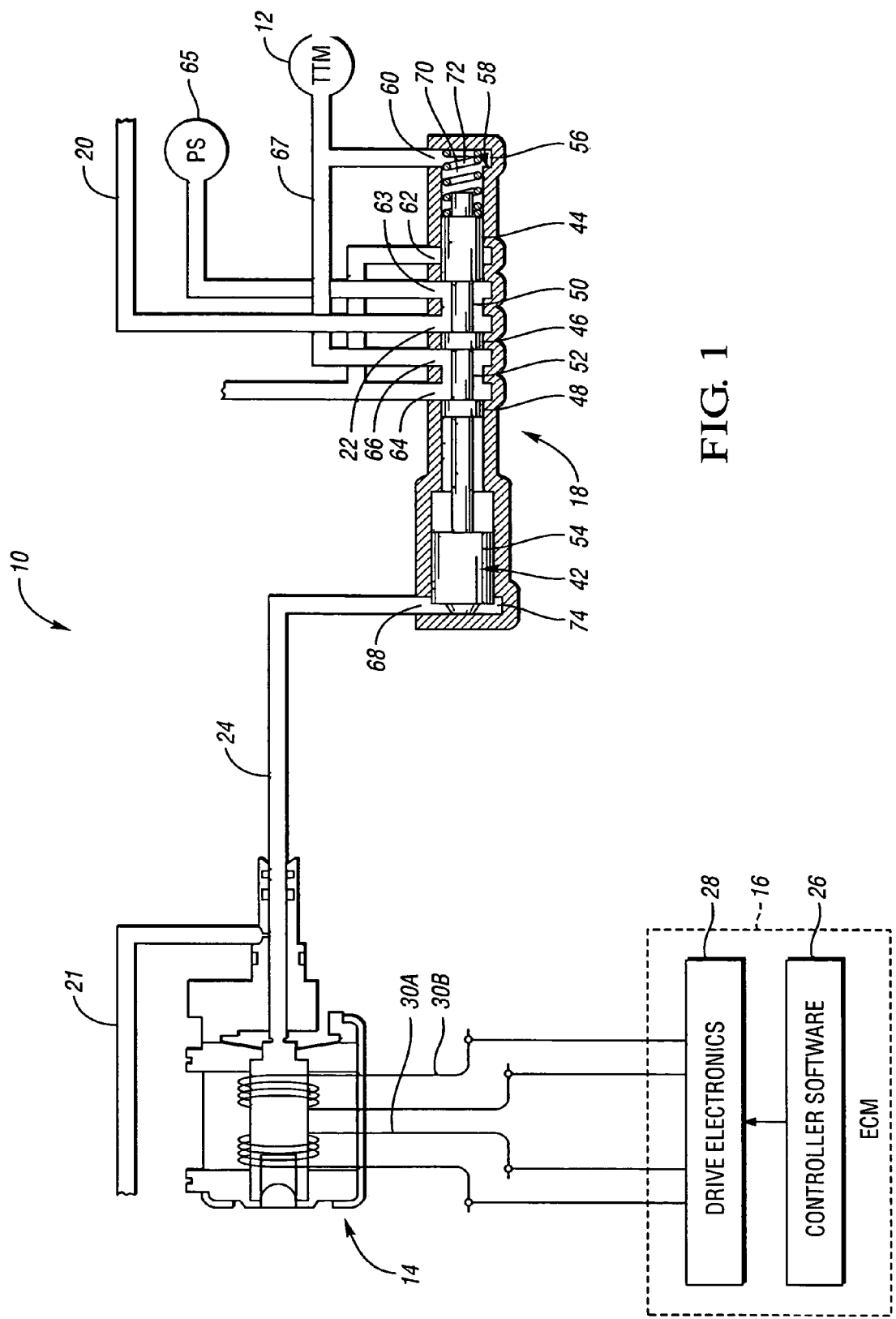
FIG. 1 is a diagrammatic and schematic representation of a portion of a torque-transmitting mechanism control system consistent with the present invention, with the apply pressure regulator valve shown in the spring bias set position.
Figure 2:
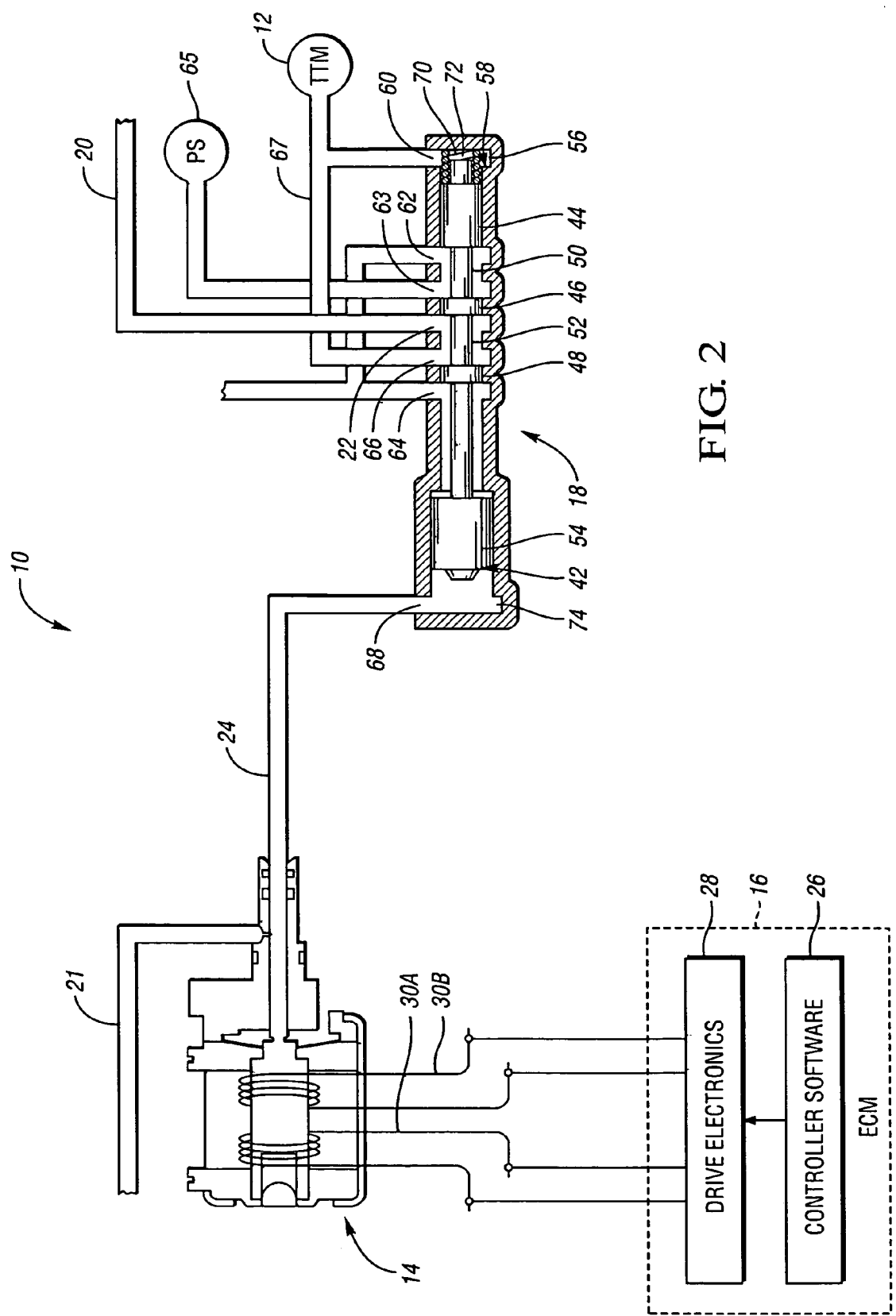
FIG. 2 is a diagrammatic and schematic representation of a portion of a torque-transmitting mechanism control system consistent with the present invention, with the apply pressure regulator valve shown in the pressure set position.

Referring to the drawings, wherein like characters represent the same or corresponding parts throughout the several views, there is shown in FIGS. 1 and 2 a portion of a torque-transmitting control or pressure control system 10 for controlling the engagement and disengagement of a torque-transmitting mechanism (TTM) 12. The torque-transmitting mechanism 12 is known in the art as a fluid-operated friction device such as a clutch or a brake, the operation of which is well know in the art.

The torque-transmitting mechanism control system 10 includes a control solenoid 14, an electronic control module (ECM) 16, and an apply or trim pressure regulator valve 18. A main pressure or line pressure passage 20 contains therein transmission fluid that is regulated to a predetermined pressure value by a conventional pump (not shown). The line pressure passage 20 provides pressurized fluid to an inlet port 22 of the apply or trim pressure regulator valve 18. A control pressure passage 21 is in fluid communication with the control solenoid 14 for delivery of pressurized fluid thereto.

The control solenoid 14 of the present invention is an electronically controlled valve mechanism, which provides an output control pressure within a control passage 24 proportional to the control signal given to the control solenoid 14. Disposed within the control solenoid 14 is a plurality of selectively and independently energizable coils 30A and 30B operable to provide a variable electromagnetic force within the control solenoid 14. Two coils, 30A and 30B have been chosen for convenience and clarity. Those skilled in the art will recognize that an additional number of coils may be employed to provide additional pressure gains. As a result of selectively energizing coils 30A and 30B, the pressure in control passage 24 may have several distinct output pressure gains 32, 34 and 36 as shown in FIG. 3.

Figure 3:
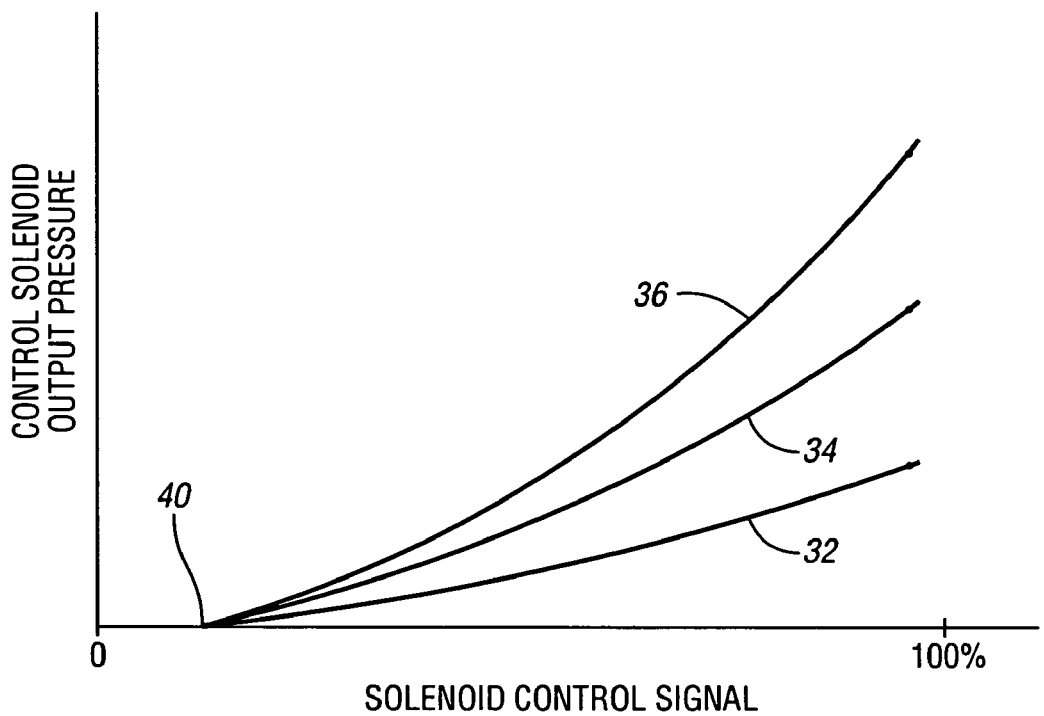
FIG. 3 is a graphical representation of the variable output pressure gain characteristic of the multiple coil control solenoid.

FIG. 3 is a graphical representation of the variable output pressure gain characteristic of the control solenoid 14. Line 32 illustrates the pressure gain within control passage 24 when only coil 30A is energized. The low gain characteristic illustrated by line 32 will allow the control solenoid 14 additional control resolution at low apply pressures. Line 34 illustrates the pressure gain within control passage 24 when only coil 30B is energized. Line 36 illustrates the pressure gain within control passage 24 when both coils 30A and 30B are energized. The point at which the electromagnetic force within the control solenoid 14 is sufficient to begin actuation of the control solenoid 14 is shown at point 40.

Referring back to FIG. 1, by selectively energizing individual coils 30A and 30B separately or in combination, different apply pressures and pressure rates may be provided to the torque-transmitting mechanism 12 for improved shift feel and transmission durability. The control solenoid 14 is controlled by the electronic control module 16, which includes a software set 26 that inputs control values to the drive electronics 28. The drive electronics 28, in turn, provides a control signal to the coils 30A and/or 30B of the control solenoid 14. Such electronic control modules 16 are well known in the art of transmission controls.

The control solenoid 14 of the present invention may be a variable bleed solenoid (VBS), a pulse-width modulated (PWM) solenoid, or a two-stage solenoid.

The apply or trim pressure regulator valve 18 includes a valve spool 42 having three equal diameter lands 44, 46, and 48 and two valleys 50 and 52 disposed respectively between lands 44 and 46 and lands 46 and 48. The valve spool 42 also has a large diameter land 54. The valve spool 42 is slidably disposed within a valve body 56, which has a valve bore 58 having portions complementary to the valve lands 44, 46, 48, and 54.

The valve body 56 includes the inlet port 22, a feedback port 60, two exhaust ports 62 and 64, a torque-transmitting mechanism feed port 66, and a control port 68. The valve spool 42 cooperates with the valve bore 58 to form a spring chamber 70 in which is disposed a spring 72. The spring 72 is operable to bias the valve spool 42 leftward in the valve bore 58, as viewed in FIGS. 1 and 2. The land 54 and the valve bore 58 cooperate to form a control chamber 74, which is in fluid communication with the control port 68.

Figure 4:
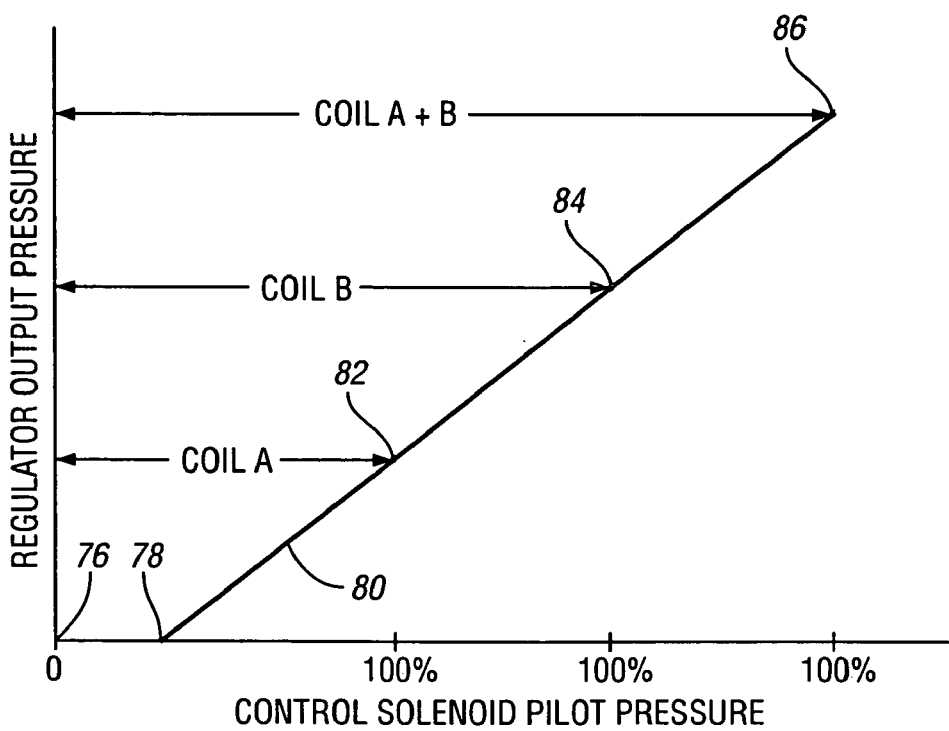
FIG. 4 is a graphical representation of the variable output gain characteristic of the apply pressure regulator valve when controlled by the control solenoid.

FIG. 1 illustrates trim pressure regulator valve 18 positioning to exhaust the pressure from the torque-transmitting mechanism 12. The torque-transmitting mechanism feed port 66 communicates with the valve bore 58 between the lands 46 and 48. When the valve spool 42 is in the spring set position, the valley 52 allows fluid communication between the torque-transmitting mechanism feed port 66 and the exhaust port 64. Additionally, the valley 50 allows pressurized fluid communication between the inlet port 22 and pressure switch port 63 thus providing a line pressure signal to the pressure switch (PS) 65 for diagnostic purposes. As shown in FIG. 4, at point 76, any latent pressure within torque-transmitting mechanism 12 is fully exhausted through the exhaust port 64 in FIG. 1. FIG. 4 illustrates the pressure gain characteristic of the torque-transmitting mechanism feed passage 67 that is in fluid communication with both the trim pressure regulator valve 18 at feed port 66 and the torque-transmitting mechanism 12.

FIG. 2 illustrates the trim pressure regulator valve 18 in the pressure set position. When engagement of the torque-transmitting mechanism 12 is desired, the fluid pressure within chamber 74, which is determined by the control solenoid 14, is increased beyond the point 78 of FIG. 4 to overcome the spring bias force of the spring 72. As the fluid pressure within the chamber 74 increases, the valve spool 42 is biased rightward against the spring 72. This movement will allow the land 46 to provide fluid communication between the torque-transmitting mechanism feed port 66 and the line inlet port 22 causing an increase in fluid pressure at the torque-transmitting mechanism 12. At essentially the same time, the exhaust port 64 is closed or blocked from fluid communication with the torque-transmitting mechanism feed port 66 by the land 48. The pressure switch port 63 will begin to exhaust pressure through the exhaust port 62.

The pressure at the torque-transmitting mechanism 12 will increase along a line 80, shown in FIG. 4. The pressure at the torque-transmitting mechanism 12 will increase to the point 82, which is the maximum trim pressure regulator output pressure achievable when only coil 30A of the control solenoid 14 is energized. If an increase in pressure within the torque-transmitting mechanism feed passage 67 is required by the torque-transmitting mechanism 12, coil 30A may be de-energized while energizing coil 30B, thus allowing the pressure output of the trim pressure regulator valve 18 to increase the pressure within passage 67 to a maximum pressure represented by point 84. When full apply pressure is desired in the torque-transmitting mechanism 12, both coils 30A and 30B may be energized thereby allowing the maximum pressure within passage 67, shown at point 86. This maximum pressure is substantially equal to the line pressure within line pressure passage 20. By selectively energizing the coils 30A and 30B within the control solenoid 14, better resolution may be achieved at low apply pressures.

When it is desired to disengage the torque-transmitting mechanism 12, the pressure in chamber 74 will be decreased by the control solenoid 14 allowing the outgoing torque-transmitting mechanism 12 apply pressure to be decreased along the line 80 by a schedule controlled by the ECM 16.

Figure 5:
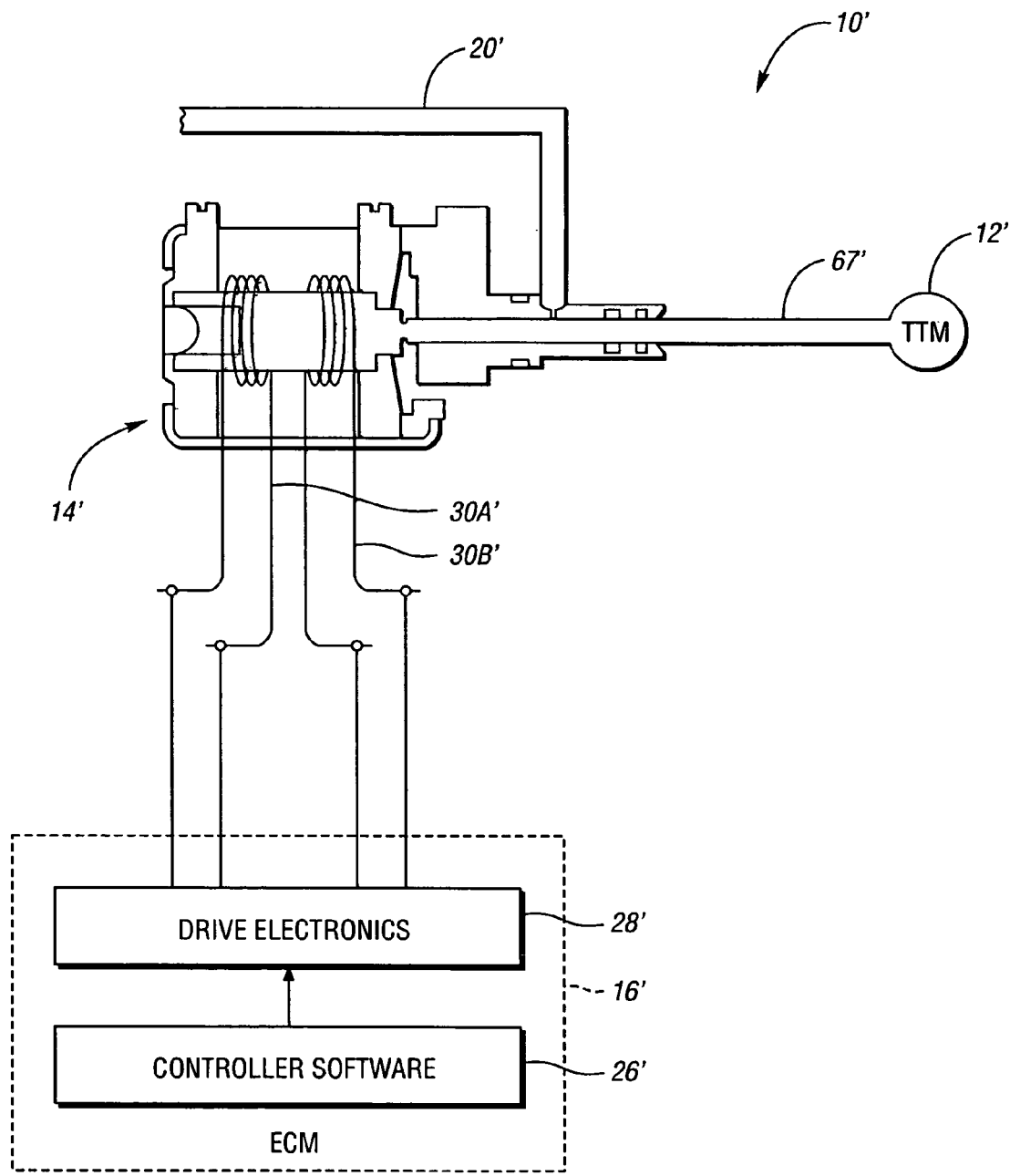
FIG. 5 is a diagrammatic and schematic representation of an alternate embodiment for a portion of a torque-transmitting mechanism control system consistent with the present invention.

FIG. 5 illustrates an alternate embodiment of a portion of a torque-transmitting mechanism control system 10' wherein the trim pressure regulator valve 18, shown in FIGS. 1 and 2, may be eliminated by providing a pressurized oil directly to the torque-transmitting mechanism 12' via a high flow control solenoid 14' with a plurality of coils 30A' and 30B' disposed therein.

In this embodiment, the line pressure passage 20' will feed fluid at line pressure directly to the control solenoid 14'. The control solenoid 14' will directly regulate the pressure within the torque-transmitting mechanism feed passage 67' which will selectively engage and disengage the torque-transmitting mechanism 12' as a result.

The selectively and independently energizable coils 30A' and 30B' are operable to provide a variable electromagnetic force within the control solenoid 14'. As result of selectively energizing coils 30A' and 30B', the pressure in the torque-transmitting mechanism feed passage 67' may have several distinct pressure gains as shown in FIG. 3. Two coils 30A and 30B have been chosen for convenience. Those skilled in the art will recognize that an additional number of coils may be employed to provide additional pressure gains. FIG. 3 is a graphical representation of the variable output pressure gain characteristic of the multiple coil control solenoid 14'. Line 32 illustrates the pressure gain within the torque-transmitting mechanism feed passage 67' when only coil 30A' is energized. The low gain characteristic of line 32 will allow the control solenoid 14' additional control resolution at low apply pressures. The line 42 illustrates the pressure gain within the torque-transmitting mechanism feed passage 67' when only coil 30B' is energized. Line 36 illustrates the pressure gain within the torque-transmitting mechanism feed passage 67' when both coils 30A' and 30B' are energized. The point at which the electromagnetic force within the control solenoid 14' is large enough to begin actuation of the control solenoid is shown at point 40.

Referring back to FIG. 5, by selectively energizing individual coils 30A' and 30B' or in combination, different apply pressures and pressure rates may be provided to the torque-transmitting mechanism 12' for improved shift feel and transmission durability. The control solenoid 14' is controlled by the electronic control module 16', which includes a software set 26' that inputs control values to the drive electronics 28', which in turn provide a control signal to the control solenoid 14'. Such electronic control modules 16' are well known in the art of transmission controls.

When it is desired to disengage the torque-transmitting mechanism 12', the pressure within the torque-transmitting mechanism feed passage 67' will be decreased by the control solenoid 14', thus allowing the outgoing torque-transmitting mechanism 12' apply pressure to be decreased by a schedule controlled by the ECM 16'.

The multiple coil control solenoid 14' of the present invention may be a variable bleed solenoid (VBS), a pulse-width modulated (PWM) solenoid, or a two-stage solenoid.

While the best modes for carrying out the invention have been described in detail, those familiar with the art to which this invention relates will recognize various alternative designs and embodiments for practicing the invention within the scope of the appended claims.

The invention claimed is:

1. A pressure control system for a torque-transmitting mechanism comprising:

a control passage operable to provide a control pressure signal;

a line pressure passage operable to provide a line pressure signal;

a trim pressure regulator valve body in fluid communication with said control passage and said line pressure passage, said trim pressure regulator valve body having a torque-transmitting mechanism feed port in fluid communication with a torque-transmitting mechanism feed passage, and operable to direct a torque-transmitting mechanism apply pressure signal to said torque-transmitting mechanism;

a pressure switch in fluid communication with said trim pressure regulator valve body and operable to selectively receive said line pressure signal from said line pressure passage for diagnostic purposes;

a valve spool slidably disposed within said trim pressure regulator valve body and operative in response to pressure from said control passage to control fluid pressure communicated between said line pressure passage and said torque-transmitting mechanism and further operative in response to the absence of fluid pressure from said control passage to direct fluid pressure from said line pressure passage to said pressure switch; and a control solenoid having a plurality of selectively energizable coils disposed therein and operable to selectively provide said control passage with pressurized fluid at varying rates of pressure gain depending upon which of said plurality of selectively energizable coils are energized.

2. The pressure control system for a torque-transmitting mechanism of claim 1, wherein said control solenoid is a variable bleed solenoid.

3. The pressure control system for a torque-transmitting mechanism of claim 1, wherein said control solenoid is a pulse width modulated solenoid.

4. The pressure control system for a torque-transmitting mechanism of claim 1, wherein said control solenoid is a two-stage solenoid.

5. The pressure control system for a torque-transmitting mechanism of claim 1, wherein said plurality of selectively energizable coils of said control solenoid are selectively energized by an electronic control module.

6. The pressure control system for a torque-transmitting mechanism of claim 1, wherein said plurality of selectively energizable coils of said control solenoid number two.

7. A pressure control system for a torque-transmitting mechanism comprising:

a control passage operable to provide a control pressure signal;

a line pressure passage operable to provide a line pressure signal;

a trim pressure regulator valve body in fluid communication with said control passage and said line pressure passage, said trim pressure regulator valve body having a torque-transmitting mechanism feed port in fluid communication with a torque-transmitting mechanism feed passage, and operable to direct a torque-transmitting mechanism apply pressure signal to said torque-transmitting mechanism;

a pressure switch in fluid communication with said trim pressure regulator valve body and operable to selectively receive said line pressure signal from said line pressure passage for diagnostic purposes;

a valve spool slidably disposed within said trim pressure regulator valve body and operative in response to pressure from said control passage to control fluid pressure communicated between said line pressure passage and said torque-transmitting mechanism and further operative in response to the absence of fluid pressure from said control passage to direct fluid pressure from said line pressure passage to said pressure switch;

a control solenoid having a plurality of selectively energizable coils disposed therein and operable to selectively provide said control passage with pressurized fluid of varying rates of pressure gain depending upon which of said plurality of selectively energizable coils are energized; and an electronic control module operable to selectively energize each of said plurality of selectively energizable coils of said control solenoid.

8. The pressure control system for a torque-transmitting mechanism of claim 7, wherein said control solenoid is a variable bleed solenoid.

9. The pressure control system for a torque-transmitting mechanism of claim 7, wherein said control solenoid is a pulse width modulated solenoid.

10. The pressure control system for a torque-transmitting mechanism of claim 7, wherein said control solenoid is a two-stage solenoid.

11. The pressure control system for a torque-transmitting mechanism of claim 7, wherein said plurality of selectively energizable coils of said control solenoid number two.

* * * * *